April 21, 1925.
H. EWALD ET AL
1,534,933
SINGLE TOOTH WHEEL FOR COUNTING APPARATUS
Filed Oct. 29, 1924
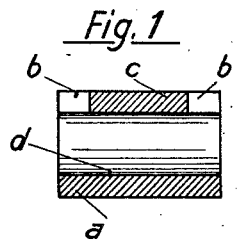
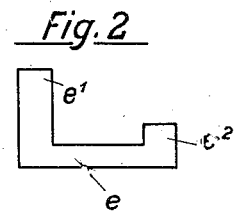
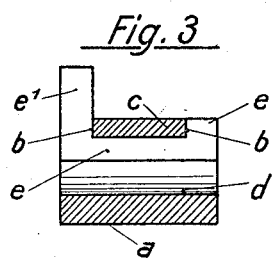
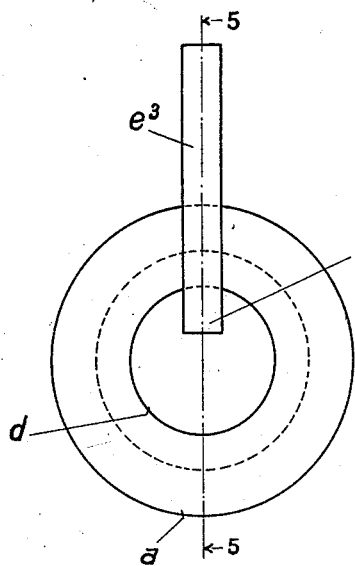
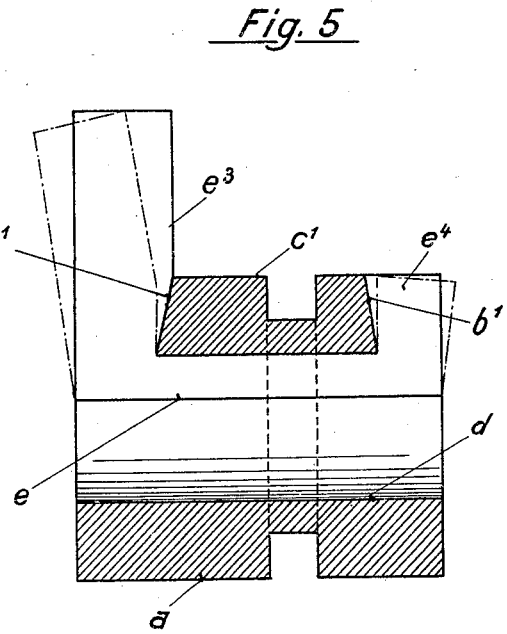
Inventors
Harry Ewald
Otto Wernecke
By
Attorney Patented Apr. 21, 1925.

1,534,933

UNITED STATES PATENT OFFICE.

HARRY EWALD AND OTTO WERNECKE, OF BRAUNSCHWEIG, GERMANY, ASSIGNORS TO GRIMME, NATALIS & CO., AKTIENGESELLSCHAFT, OF BRAUNSCHWEIG, GERMANY, A CORPORATION OF GERMANY.

SINGLE-TOOTH WHEEL FOR COUNTING APPARATUS.

Application filed October 29, 1924. Serial No. 746,597.

*To all whom it may concern:*

Be it known that we, HARRY EWALD and OTTO WERNECKE, citizens of Germany, residing at Braunschweig, Germany, have invented certain new and useful Improvements in Single-Tooth Wheels for Counting Apparatus (for which we have filed applications in Germany, Nov. 3, 1923, and Austria, Sept. 20, 1924), of which the following is a specification.

Our invention relates to improvements in single tooth wheels for counting apparatus, and more particularly in single tooth wheels used in calculating machines. The object of the improvements is to provide a single tooth wheel which may be manufactured at low cost. With this object in view our invention consists in constructing the single tooth wheel from a sleeve formed at its ends with corresponding notches and passing a U-shaped member through said sleeve with the shank portions fitting in the notches and the base portion providing a feather for securing the wheel on the shaft.

For the purpose of explaining the invention several examples embodying the same have been shown in the accompanying drawing in which the same reference characters have been used in all the views to indicate corresponding parts. In said drawing, Fig. 1, is a sectional elevation showing the sleeve, Fig. 2, is an elevation showing the U-shaped member, Fig. 3, is a sectional elevation showing the parts illustrated in Figs. 1 and 2 assembled, Fig. 4, is an elevation showing a modification, and Fig. 5, is a section taken on the line 5—5 of Fig. 4.

In the example shown in Figs. 1 to 3 the single tooth wheel consists of a sleeve $a$ formed at corresponding parts of the end faces with notches $b$, $b$ providing a bridge portion $c$, and a U-shaped member consisting of a base portion $e$ and shanks $e^1$ and $e^2$. The shanks $e^1$ and $e^2$ are different in length, the length of the shank $e^1$ corresponding to that of the single tooth and the length of the shank $e^2$ corresponding to the thickness of the wall of the sleeve $a$. The sleeve and U-shaped member are assembled by passing the member through the bore of the sleeve and fitting the shanks $e^1$ and $e^2$ in the notches $b$, $b$, while the base portion $e$ is located in the bore of the sleeve thus providing a feather for fixing the wheel in position on its shaft. As appears from Fig. 3 the shank $e^2$ merely fills out the corresponding notch $b$, while the shank $e^1$ projects beyond the sleeve and provides the single tooth. When the wheel is placed on a grooved shaft the U-shaped member is held in position by the groove of the shaft, and its base portion fixes the wheel in position.

In the modification shown in Figs. 4 and 5 the inner walls of the notches $b^1$, $b^1$ are inclined outwardly and towards each other so that the bridge portion $c^1$ is dovetailed in form, and before being assembled the shank portions $e^3$ and $e^4$ are inclined outwardly as is shown in Fig. 5 in dotted lines. After assembling the parts the shanks are bent inwardly into the positions shown in full lines. Thereby the sleeve and U-shaped member are rigidly connected with each other so that the wheel can be handled without being mounted on a grooved shaft.

We wish it to be understood that we do not limit ourselves to the angular position of the shanks before and after being secured to the sleeve such as is shown in Fig. 5.

We claim:

1. A single tooth wheel for counting mechanisms such as calculating machines, comprising a sleeve formed at corresponding parts of its end faces with notches, and a U-shaped member passed with its base portion through the bore of the sleeve and with its shank portions fitting in said notches, one of said shanks projecting beyond the outer circumference of the sleeve.

2. A single tooth wheel for counting mechanisms such as calculating machines, comprising a sleeve formed at corresponding parts of its end faces with notches having their end walls inclined outwardly and towards each other, and a U-shaped member passed with its base portion through the bore of the sleeve and with its shank portions fitting in said notches, one of said shanks projecting beyond the outer circumference of the sleeve.

In testimony whereof we have affixed our signatures.

HARRY EWALD.
OTTO WERNECKE.